United States Patent [19]
Lind

[11] 3,808,379
[45] Apr. 30, 1974

[54] TELEPHONE TONE RINGER

[75] Inventor: Paul U. Lind, Lombard, Ill.

[73] Assignee: GTE Automatic Electric Laboratories Incorporated, Northlake, Ill.

[22] Filed: May 30, 1972

[21] Appl. No.: 257,650

[52] U.S. Cl. .................. 179/84 T
[51] Int. Cl. .................. H04m 1/26
[58] Field of Search .................. 179/84 T

[56] References Cited

UNITED STATES PATENTS

| | | | |
|---|---|---|---|
| 3,508,012 | 4/1970 | Golembeski | 179/84 T |
| 3,603,740 | 9/1971 | Cambridge | 179/84 T |
| 2,808,463 | 10/1957 | Jenkins | 179/84 T |

OTHER PUBLICATIONS

The Radio Amateur's Handbook 1971 p. 95

*Primary Examiner*—William C. Cooper
*Assistant Examiner*—Alan Faber
*Attorney, Agent, or Firm*—Robert J. Black

[57] ABSTRACT

A tone ringer which employs a detector which is operatively responsive to both conventional ringing signals and to tone signals, and a tone oscillator which is used solely as an oscillator and is triggered by a DC signal passed by the detector when a valid ringing or tone signal is received by the tone ringer. The output of the tone oscillator is coupled to a driving circuit for a tone producing transducer, and the tone oscillator can alternatively be operated to produce a steady ringing signal or tone, or a conventional interrupted one.

11 Claims, 1 Drawing Figure

PATENTED APR 30 1974 3,808,379
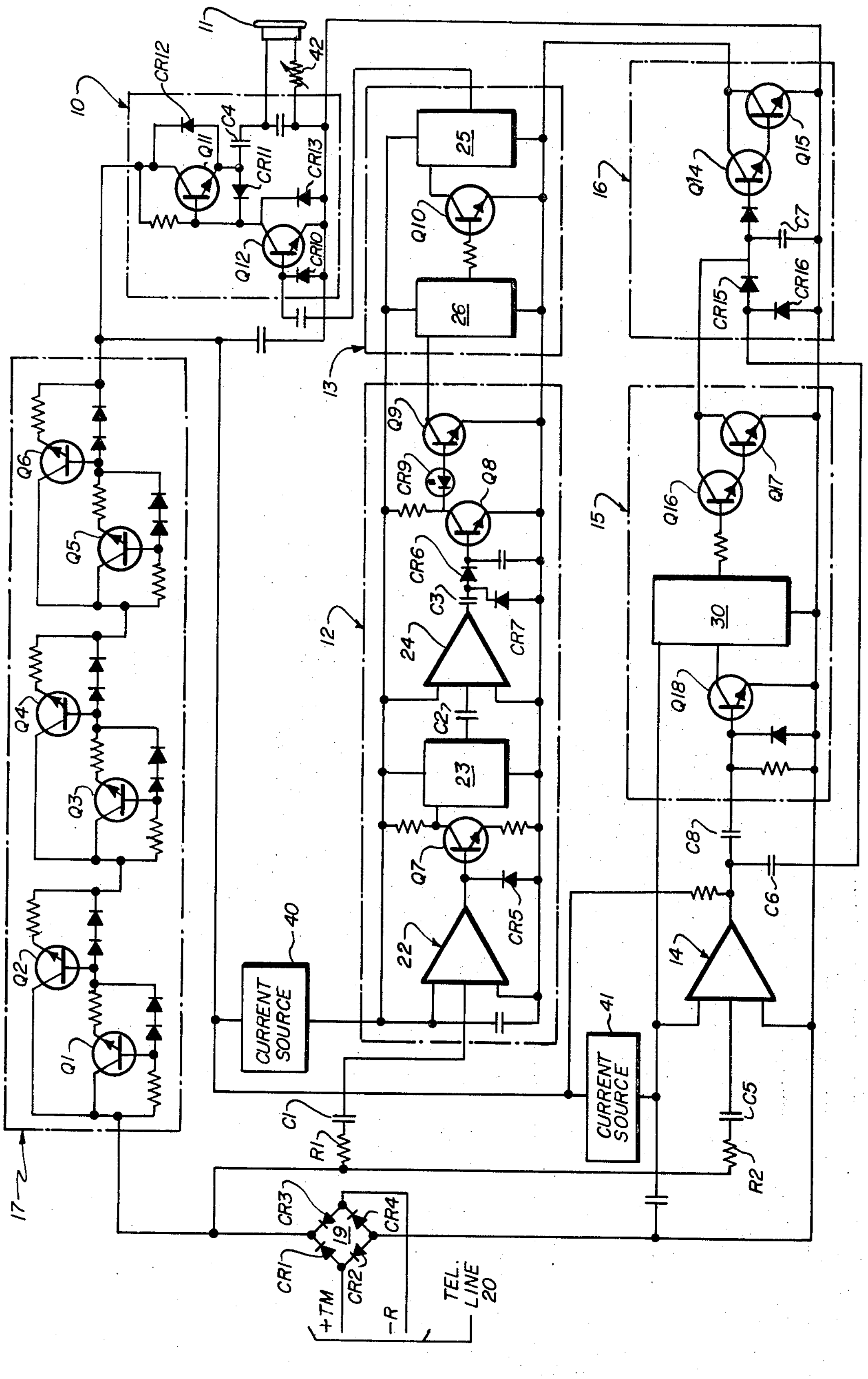

TELEPHONE TONE RINGER

This invention relates, in general, to tone ringers and, more particularly, to tone ringers for use in a telephone system.

In recent years, tone ringers have been replacing the conventional electro-mechanical bell ringers commonly used for signaling telephone subscribers. In U.S. Pat. 3,508,012, one such tone ringer is disclosed, and the difficulties encountered in substituting tone ringers for the conventional electro-mechanical bell ringers are discussed in substantial detail.

The ringer disclosed in the above-mentioned U.S. patent employs an oscillator as an active filter and, as a result, suffers several shortcomings. One such shortcoming is the fact that the audible tone or ringing signal is distorted by the input signal. Another is that if the high level input is limited to, for example, 40 volts, the audible tone or ringing signal and the ring back tone will differ in sound. Further still, to provide immunity against single or steady tones, two separate oscillators and an AND-gate are required.

The above-indicated shortcomings are avoided, and additional improvements are provided, with the tone ringer of the present invention which employs a detector which is operatively responsive to both conventional ringing signals and to tone signals, and a tone oscillator which is used solely as an oscillator and is triggered by a DC signal passed by the detector when a valid ringing or tone signal is received by the tone ringer. The output of the one oscillator is coupled to a driving circuit for a tone producing transducer, and the tone oscillator can alternatively be operated to produce a steady ringing signal or tone, or a conventional interrupted one. In addition, the audible output of the tone ringer is not effected when the excitation mode is changed, and the audible output can be easily adjusted in volume, in accordance with the subscribers preference.

Other features of the tone ringer include the provision of means whereby a bridged tone ringer will not respond to dial or hook switch pulses present on the same cable pair, nor will a bridged tone ringer while ringing cause a false off-hook condition. The tone ringer also will not respond to a single or steady input tone.

Accordingly, it is an object of the present invention to provide an improved tone ringer, and particularly, improved tone ringers for use in telephone systems.

Another object is to provide improved tone ringers which when used in a telephone system are operatively responsive both to conventional low-frequency, high-voltage ringing signals and to high-frequency, low-voltage tone signals.

A still further object is to provide improved tone ringers including means for preventing a bridged tone ringer from responding to dial or hook switch pulses, and for preventing a false off-hook condition when a bridged tone ringer is ringing.

Still another object is to provide improved tone ringers having a low idling or standby current.

Still another object is to provide improved tone ringers which will not respond to steady or single input tones.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 1 is a schematic illustration of a tone ringer exemplary of the present invention.

Referring now to the drawings, the tone ringer can be seen to include as its principal components a transducer-driver 10 for driving a tone producing transducer 11 which can be the receiver of a standard or conventional telephone hand set; a detector 12; and a tone oscillator 13. The detector 12 is responsive to both relatively low-frequency, high-voltage conventional ringing signals and relatively high-frequency, low-voltage tone signals, and produces a DC output signal which is coupled to and triggers the operation of the tone oscillator 13. The conventional ringing signals are typically 80 volt, 20 Hz signals, and the tone signals are typically a combination of 440 Hz and 480 Hz signals, at a low voltage. The detector 12 includes an envelope detector and a low-pass filter for detecting the respective ringing signals. The tone ringer also preferably includes an input amplifier 14, a dial and hook switch pulse inhibitor 15 and an electronic switch 16, for preventing the tone ringer from responding to dial and hook switch pulses and for establishing a low idling or standby current, as more fully described below. A current limiter or source 17 also is provided for energizing the tone ringer.

More specifically, a polarity-protecting diode bridge 19 including diodes CR1–CR4 is connected across the telephone line 20, and its outputs are coupled to the current limiter 17 and either directly to the tone oscillator 13, or alternatively and preferably, through the electronic switch 16 to the tone oscillator 13, as illustrated, for reasons set forth more specifically below. The current limiter or source 17 includes the transistors Q1–Q6 which form three current sources which are connected in series. These current sources absorb the high-voltage peaks of the conventional ringing signals, and provide a constant current output for the operation of the tone ringer.

The ringing signals are couple through the resistor R1 and the capacitor C1 to the input of a self-biasing linear amplifier 22 of the detector 12. The conventional 20 Hz ringing signals are passed by the transistor Q7, with diode CR5 acting as a clamp diode. The 440–480 Hz tone mixture is envelope detected by the diode CR5 so that the 40 Hz envelope appears at the collector of the transistor Q7. An active low-pass filter 23 passes either the 20 Hz high-level ringing or the 40 Hz envelope to a self-biasing amplifier 24, through coupling capacitor C2. The coupling capacitor C2 also blocks any DC which could result from a single tone input, so that the tone ringer is not responsive to any steady or single tone signal inputs.

The 20 or 40 Hz output signals from the amplifier 24 are coupled by the capacitor C3 to the diodes CR6 and CR7 which detect the peak-to-peak voltage by the clamping action of the diode CR7 which holds the AC signal above ground. The transistor Q8 functions as a detector, and turns on when a valid ringing signal is present, and the transistor Q9 functions as a switch to trigger the operation of the tone oscillator 13. The diode CR9 is a zener diode which insures that the transistor switch Q9 turns off during ringing, even if the transistor Q8 does not saturate.

The tone oscillator 13 includes a free running multivibrator 25 having an output frequency of 2,800 Hz, and may also include a multivibrator 26 having a frequency of 15 Hz for interrupted tone ringing signal. The transistor switch Q9 in the detector 12 normally is conductive and prevents the multivibrator 25, or 26, from running. During ringing, the transistor switch Q9 turns off, thus permitting the multivibrator 25 and multivibrator 26 to oscillate. The transistor Q10 functions as a switch to interrupt the multivibrator 25 at the 15 Hz rate, when the multivibrator 26 is provided.

The output of the tone oscillator 13 is coupled to the transducer driver 10, which includes the transistors Q11 and Q12. The capacitor C4 couples to the transducer 11, and prevents any current during idle or standby when the transistor Q11 would be conducting, if it has a DC load on its emitter.

The diode CR10 acts as a clamping diode giving full peak-to-peak drive voltage to drive the base of the transistor Q12. When the transistor Q12 conducts, an output current is drawn through the diode CR11 and the collector of the transistor Q12. The transistor Q11 turns on whenever the transistor Q12 is off. The diode CR11 is then back-biased. The diodes CR12 and CR13 protect the transistors Q11 and Q12 from any inductive spikes produced by the transducer 11.

Accordingly, from the above description, it can be seen that both the conventional ringing signals and the tone signals are detected by the detector 12 and that the latter triggers the tone oscillator 13 to drive the transducer driver 10 which drives the transducer 11, to produce either a continuous tone ringing signal, or a conventional interrupted tone ringing signal. Since the tone oscillator 13 functions solely as an oscillator in driving the transducer driver 10, the audible output of the tone ringer is not effected when the excitation mode is changed, from a conventional ringing signal to a tone signal, or vice versa. Furthermore, the detector 12 is responsive to pass only the 20 Hz conventional ringing signal or an envelope of an audio-frequency provided the envelope is 40 Hz or less, so that the tone ringer is not responsive to a single tone, such as a 440 Hz or a 480 Hz signal. The audible output of the transducer 11 can be adjusted in volume, simply by adjusting the variable resistor 42 in series with it.

As indicated above, the tone ringer also preferably includes an input amplifier 14, a dial and hook switch pulse inhibitor 15 and an electronic switch 16. Normally, these circuits and the current limiter or source 17 and the transducer driver 10 are the only active circuits in the tone ringer. The detector 12 and the tone oscillator 13 do not have a ground return, unless the electronic switch 16 is energized, and hence are normally inactive. In this fashion, the idling or standby current is kept very low until an AC signal appears across the telephone line 20. At this time, the AC signal is coupled through the resistor R2 and the capacitor C5 to the input amplifier 14 which is a low power input amplifier which is operative whenever 50 volt battery is present. The amplified AC signal output from the input amplifier 14 is coupled through the capacitor C6 to the electronic switch 16, and are rectified by the diodes CR15 and CR16. The rectified signal charges the capacitor C7 to turn on the transistors Q14 and Q15. When the transistor Q15 is conductive, a ground return is provided for the detector 12 and the tone oscillator 13, thus rendering these circuits active and fully enabling the tone ringer. Five such tone ringers bridged on the same telephone line represent a DC impedance of approximately 500K ohms when not ringing. And, when office battery is present on the line, the tone ringer each draw approximately 20 $\mu$a current. While ringing, one tone ringer draws a maximum of approximately 2MA current, such that five such bridged tone ringers cannot trip the ring and cause a false off-hook condition.

The dial and hook switch pulse inhibitor 15 is always active and includes a transistor switch Q18, a free running multivibrator 30 and a pair of transistors Q16 and Q17 which also function as a switch. The multivibrator 30 pulses the transistors Q16 and Q17 on at a rate of 15 times per second, which normally would discharge the capacitor C7 and prevent the electronic switch 16 from operating. However, the multivibrator 30 is prevented from completing a full oscillation cycle and pulsing the transistors Q16 and Q17 by the transistor switch Q18, if the latter is rendered conductive more than 15 times per second. Thus, when the conventional 20 Hz ringing signal, or the 448–480 Hz tone signal, is present on the telephone line 20, it is coupled to capacitor C8 to the transistor switch Q18. These ringing signals pulse the transistor switch Q18 more than 15 times per second, thus preventing the multivibrator 30 from running. The transistors Q16 and Q17 therefore stay off and allow the electronic switch 16 to operate. Only signals having frequencies higher than 15 Hz can stop the multivibrator 30 and allow the electronic switch 16 to operate, to provide the ground return for the detector 12 and the tone oscillator 13. Accordingly, the tone ringer will not respond to dial or hook switch pulses.

The tone ringer can be operated on less than the conventional 50 volt office battery, and can be operated on, for example, a 24 volt PBX battery. In such cases, the 0.7MA current source 40 and the 20$\mu$a current source 41 are provided.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A tone ringer for a telephone set operatively responsive to either relatively low-frequency, high-voltage input signals or to relatively high-frequency, low-voltage input signals comprising:

a. a tone oscillator having a predetermined output frequency;

b. a transducer coupled to and driven by said output frequency of said tone oscillator to produce an audible tone signal;

c. a detector;

d. said tone oscillator being coupled to the output of said detector;

e. said detector being responsive to both said relatively low-frequency, high-voltage signals and said relatively high-frequency, low-voltage signals and triggering said oscillator into operation upon detecting either of said singals to drive said transducer to produce said audible tone, said tone oscillator functioning solely as an oscillator in driving said transducer, whereby the audible tone signal of said transducer is not affected when the excitation mode thereof is changed, by the receipt of said relatively low-frequency, high-coltage signals or the receipt of said relatively high-frequency, low-coltage signals.

2. The tone ringer of claim 1, further including:

a. electronic switch means coupled to and normally blocking the operation of said tone oscillator and b. amplifier means responsive to said low-frequency, high-voltage and high-frequency, low-voltage signals;

c. said electronic switch means being coupled to the output of said amplifier means and triggered by the latter to render said tone oscillator operative.

3. The tone ringer of claim 1, further including a DC current source coupled to said transducer for limiting the current through said ringer, whereby excess current and false ring trip is prevented when said low-frequency, high-voltage signals are coupled thereto.

4. The tone ringer of claim 2, wherein the ground return for said detector and said tone oscillator is controlled by said electronic switch means, whereby said detector and said tone oscillator are inoperative unil either said low-frequency, high-voltage signal or said high-frequency, low-voltage signal is coupled to said tone ringer, to thereby establish a low standby idling current.

5. The tone ringer of claim 1, wherein said detector comprises an active low-pass filter means and an envelope detector, whereby low-frequency, high-voltage signals and high-frequency, low-voltage signals a combination of various predetermined frequencies can be detected.

6. The tone ringer of claim 5, further including means for blocking an output from said detector resulting from a high-frequency, low-voltage single tone input to said ringer.

7. The tone ringer of claim 2, further including a dial and hook switch pulse inhibitor coupled between the output of said amplifier means and the input of said electronic switch means, said pulse inhibitor normally being operative to disable said electronic switch means to prevent the latter from rendering said tone oscillator operative, said amplifier means responsive to said low-frequency, high voltage and said high-frequency, low-voltage signals rendering said pulse inhibitor inoperative to enable said electronic switch means.

8. The tone ringer of claim 7, wherein said pulse inhibitor comprises switch means, oscillating means connected to and triggering said switch means operative at an established frequency to prevent said electronic switch means from rendering said tone oscillator operative, said oscillating means being coupled to and rendered inoperative by said amplifier means upon the latter being rendered responsive to said low-frequency, high-voltage and high-frequency, low-voltage signals.

9. The tone ringer of claim 1, further including means for regulating the volume of said transducer.

10. The tone ringer of claim 9, wherein said means for regulating the volume of said transducer comprises variable resistance means in series circuit with transducer.

11. A tone ringer for a telephone set operatively responsive to either relatively low-frequency, high-voltage input signals or to relatively high-frequency, low-voltage input signals comprising:

a. a tone oscillator having a predetermined output frequency;

b. a transducer coupled to and driven by said outer frequency of said tone oscillator to produce an audible tone signal;

c. a detector;

d. said tone oscillator being coupled to the output of said detector;

e. said detector being responsive to both said relatively low-frequency, high-voltage signals and said relatively high-frequency, low-voltage signals and triggering said oscillator into operation upon detecting either of said signals to drive said transducer to produce said audible tone, said tone oscillator functioning solely as an oscillator in driving said transducer, whereby the audible tone signal of said transducer is not affected when the excitation mode thereof is changed, by the receipt of said relatively low-frequency, high-voltage signals or the receipt of said relatively high-frequency, low-voltage signals;

f. electronic switch means coupled to and normally blocking the operation of said tone oscillator;

g. amplifier means responsive to said low-frequency, high-voltage signals and said high-frequency, low-voltage signals;

h. said electronic switch means being coupled to the output of said amplifier means and triggered by the latter to render said tone oscillator operative;

a dial and hook switch pulse inhibitor coupled between the output of said amplifier means and the input of said electronic switch means, said pulse inhibitor normally being operative to disable said electronic switch means to prevent the latter from rendering said tone oscillator operative, said amplifier means responsive to said low-frequency, high-voltage and said high-frequency, low-voltage signals rendering said pulse inhibitor inoperative to enable said electronic switch means.

* * * * *

UNITED STATES PATENT OFFICE
CERTIFICATE OF CORRECTION

Patent No. 3,808,379 Dated April 30, 1974

Inventor(s) PAUL U. LIND

It is certified that error appears in the above-identified patent and that said Letters Patent are hereby corrected as shown below:

Column 5, line 1, "signals" misspelled

Column 5, line 7, "voltage" misspelled

Column 5, line 9, "voltage" misspelled

Column 5, line 36, after "signals" add -- consisting of --

Column 6, line 18, "outer" should be -- output --

Column 6, line 45, before "a dial" insert -- i --

Signed and sealed this 10th day of September 1974.

(SEAL)
Attest:

McCOY M. GIBSON, JR.
Attesting Officer

C. MARSHALL DANN
Commissioner of Patents

USCOMM-DC 60376-P69
U.S. GOVERNMENT PRINTING OFFICE 1969 O—366-334